United States Patent [19]

Edwards

[11] Patent Number: 4,582,351
[45] Date of Patent: Apr. 15, 1986

[54] ATLAS BUMPER LIFT

[76] Inventor: Sherman J. Edwards, Box 5470, Zapata, Tex. 78076

[21] Appl. No.: 555,170

[22] Filed: Nov. 25, 1983

[51] Int. Cl.$^4$ .............................................. B60R 19/02
[52] U.S. Cl. ..................................... 293/118; 293/102
[58] Field of Search ........................ 293/118, 102, 119; 296/1 S

[56] References Cited

U.S. PATENT DOCUMENTS

| | | | |
|---|---|---|---|
| 2,990,212 | 6/1961 | Nicastro | 293/118 X |
| 3,533,654 | 10/1970 | Kannegieter | 293/118 |
| 4,119,339 | 10/1978 | Heimburger | 296/1 S |
| 4,360,228 | 11/1982 | Rasmussen et al. | 293/118 |
| 4,514,002 | 4/1985 | McIntosh | 293/118 |

FOREIGN PATENT DOCUMENTS

| | | | |
|---|---|---|---|
| 2352179 | 4/1975 | Fed. Rep. of Germany | 293/118 |
| 2843670 | 4/1980 | Fed. Rep. of Germany | 293/118 |

*Primary Examiner*—Robert B. Reeves
*Assistant Examiner*—Russell D. Stormer

[57] ABSTRACT

This invention is an automotive vehicle, including front and rear bumpers, each of which is mounted on a lift pivoted on a chassis frame, so as to be raised or lowered, and includes hydraulic or mechanical members to pivot the lift, and a latch mechanism to secure the bumper in the selected position.

1 Claim, 8 Drawing Figures

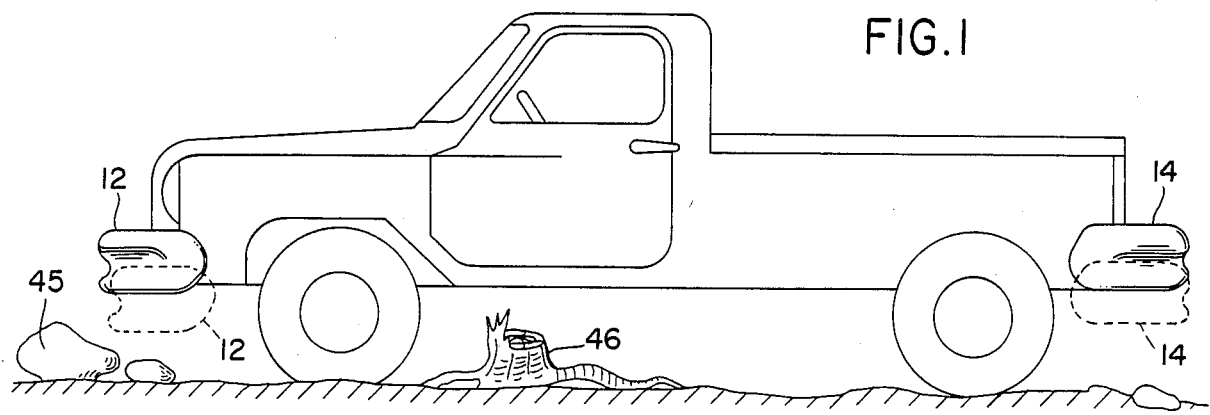
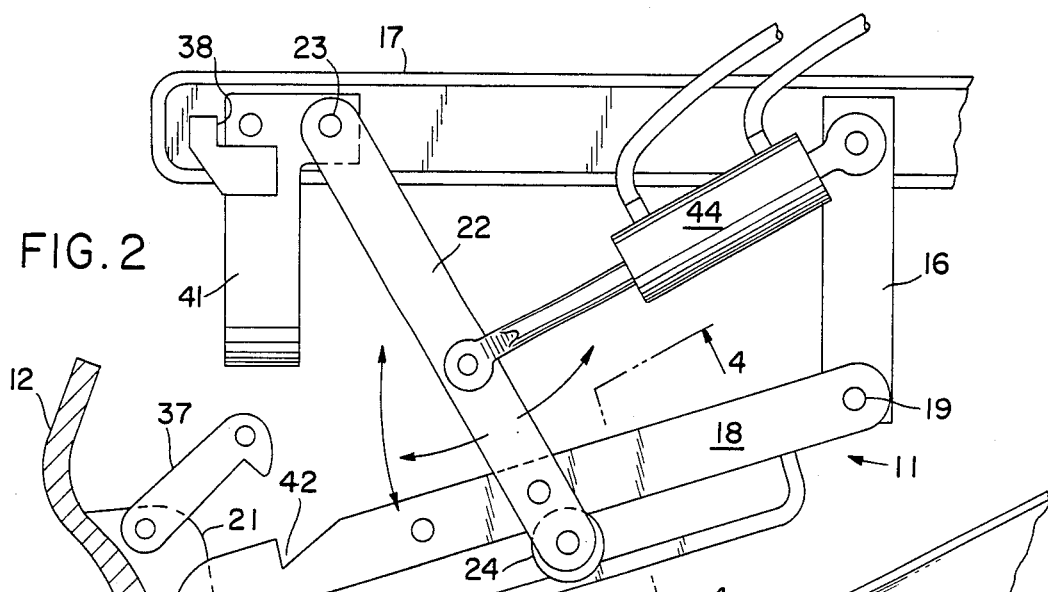
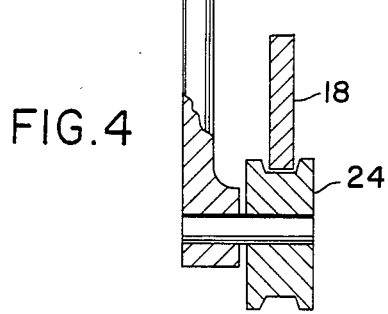
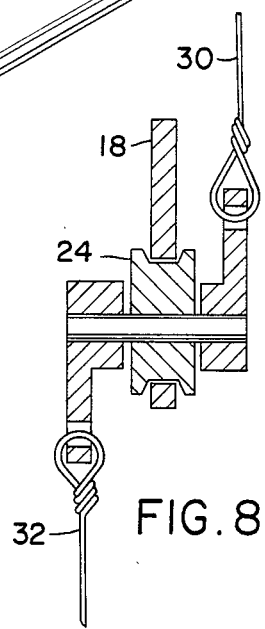

ATLAS BUMPER LIFT

This invention relates generally to automotive vehicle bumpers. More specifically, it relates to elevating mechanisms for automotive vehicle bumpers.

It is generally well known that many automotive vehicles are used for both on-road and off-road travel, particularly when such vehicle is owned by a sportsman or hunter, who uses the vehicle for highway travel between his home and a rural region, where he then leaves the highway and continues travel across a wilderness area, having either a rough or no road at all, so that the vehicle must move across big rocks, tree stumps or other raised obstructions, that extend upward higher then the vehicle bumper. A conventional automotive vehicle, with stationary bumpers, is thus limited to travel only across lower such obstructions, which can seriously hamper the sportsman or hunter in having access into remote and rugged wilderness. This situation is objectionable, and is, therefore, in need of an improvement.

Therefore, it is a principal object of the present invention to provide an automotive vehicle having bumpers that are adjustable in elevation, so that, in a lowered position, the bumpers are at a conventional legal height for roadway travel, and, in a raised position, are out of the way, so that the vehicle can travel across tall obstacles of a rough terrain.

Another object is to provide an automotive vehicle, which, accordingly, is suitable for week day use in going to work or shopping, and, on holidays, is used for pleasure, thus eliminating the need to own two different types of vehicles, such as a passenger car and a jeep.

Other objects are to provide an atlas bumper lift, which is simple in design, inexpensive to manufacture, rugged in construction, easy to use, and efficient in operation.

These, and other objects, will be readily evident, upon a study of the following specification, and the accompanying drawing, wherein:

FIG. 1 is a perspective view of a pickup truck incorporating the present invention.

FIG. 2 is a perspective view of the front bumper shown in a lowered position.

FIG. 3 is a perspective view of the bumper.

FIG. 4 is a partial section taken along line 4—4 of FIG. 2.

FIG. 8 is a cross section taken along lines 8—8 of FIG. 5.

Figure 5:
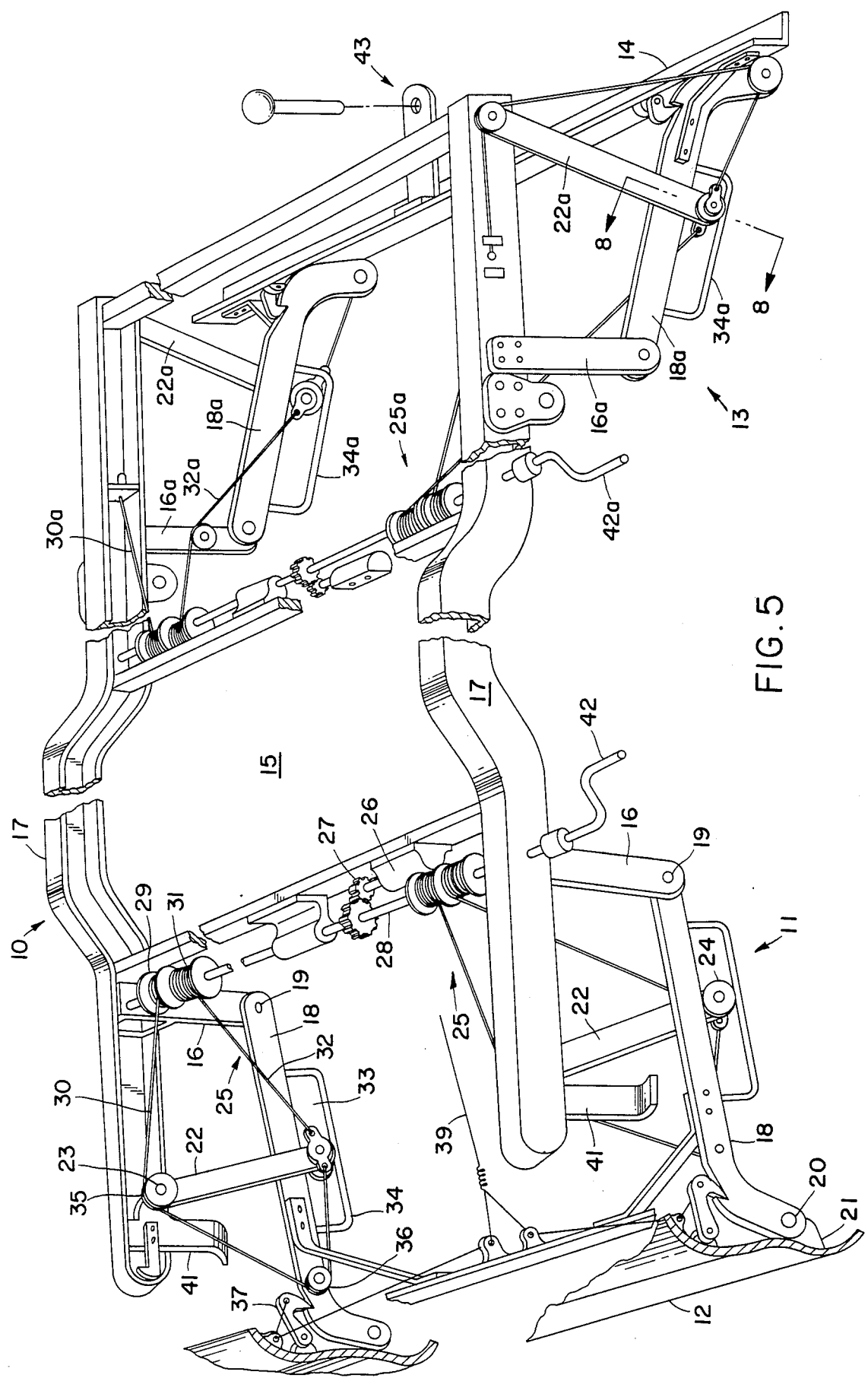
FIG. 5 is a top perspective view of a vehicle chassis frame showing the present invention incorporated at the opposite ends of a pickup truck and illustrating the front and rear bumpers in a lowered position.

Referring now to the drawing in greater detail, the reference numeral 10 represents a chassis frame of an automotive vehicle, the frame having an elevating lift 11 at its forward end, carrying a front bumPer 12, while an elevating lift 13, on the rear end of the frame, carries a rear bumper 14, so that these bumpers may be selectively elevated or lowered, as wished, by the vehicle operator. The frame 10 is made from channel irons, and is generally rectangular in shape, around a central space 15.

Figure 6:
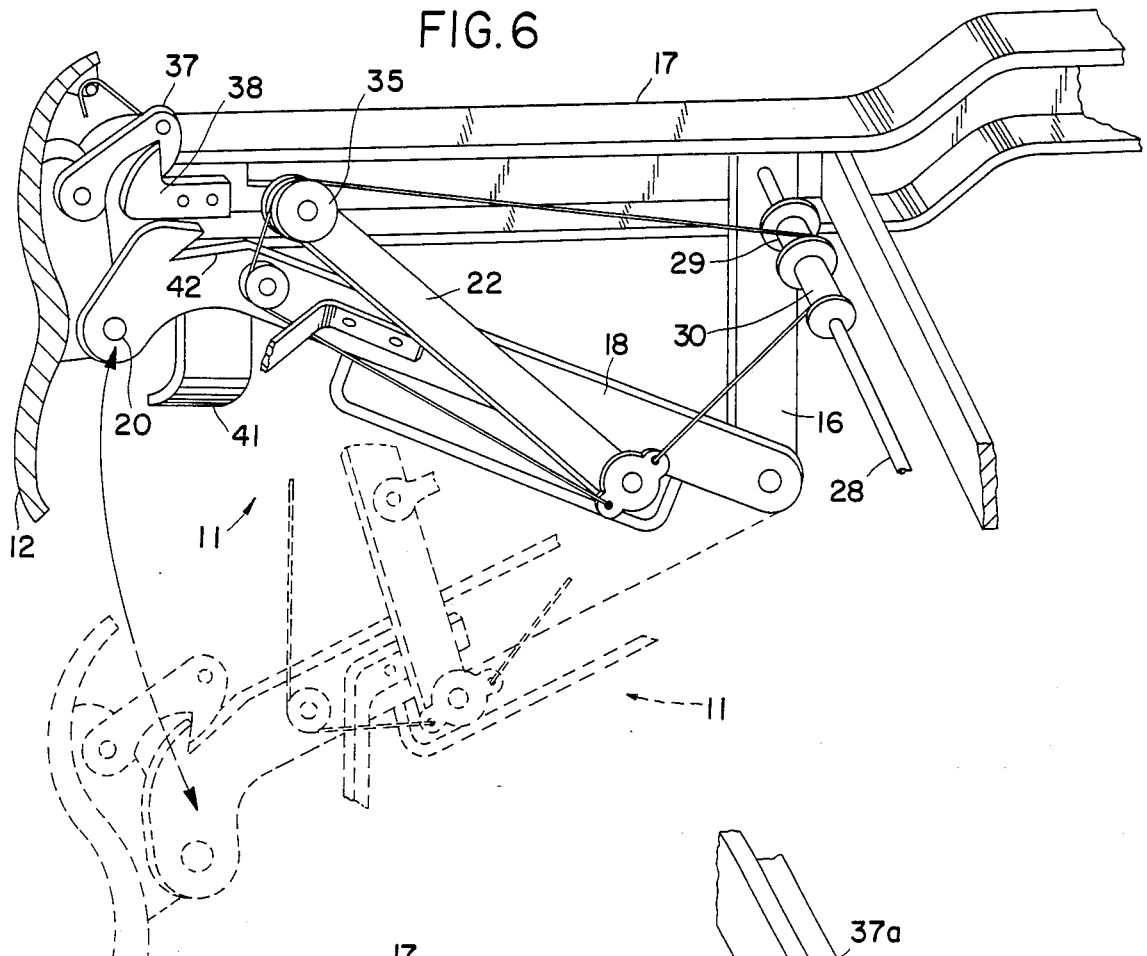
FIG. 6 is a perspective view of the front bumper shown in a raised position.
Figure 7:
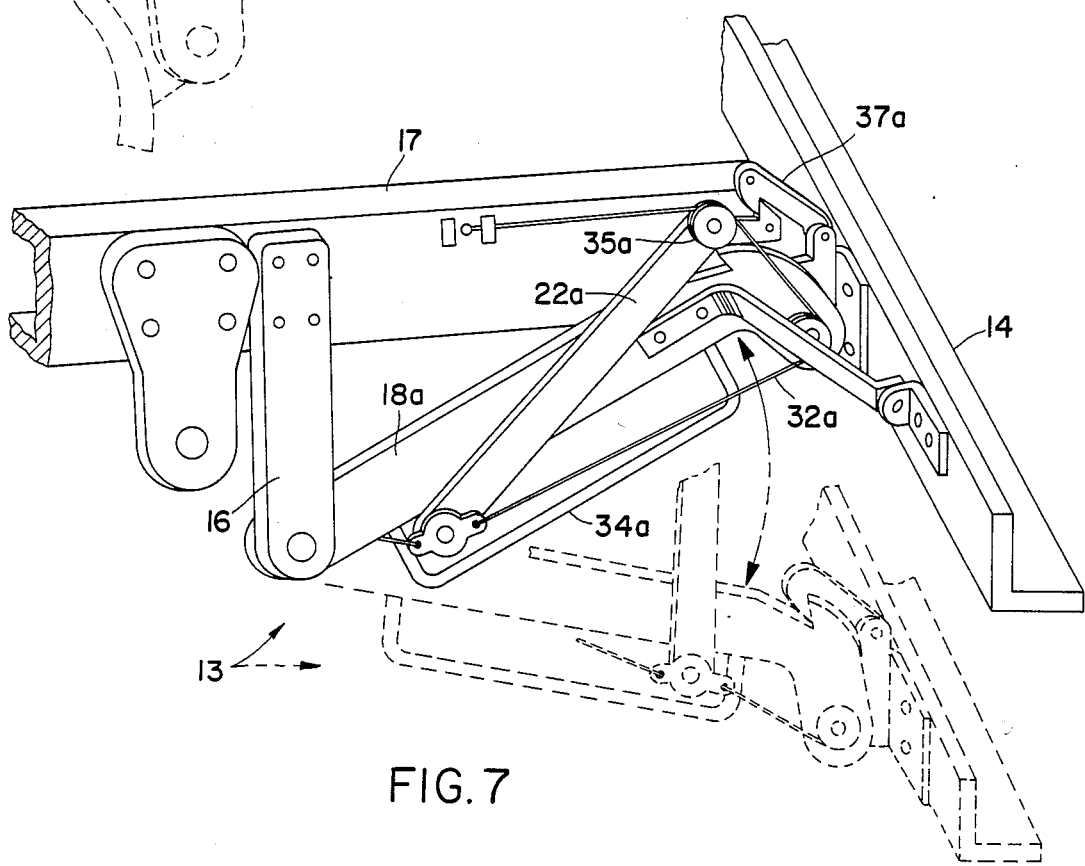
FIG. 7 is a perspective view of the rear bumper shown in a raised position.

The lift 11 includes a pair of stationary hangers 16, rigidly affixed to the longitudinal beams 17 of the frame, and extend downwardly therefrom. An arm 18 is pivotally supported by a pin 19 to a lower end of each hanger. The outward end of the arm is pivotally attached, by a pin 20, to a bracket 21 secured to the bumper. The two arms 18 are pivotally controlled by a pair of links 22, each of which is pivotally supported by a pin 23 from the beam 17. Each arm 18 rests upon a roller 24, carried at a lower end of the link. The link is pivotally controlled by a double cable mechanism 25, that includes a reversible electric motor 26, which, through gearing 27, drives a shaft 28 in either rotational direction. A drum 29, on the shaft, winds a cable 30 in one rotational direction, while a drum 31, on the shaft, winds a cable 32 in an opposite rotational direction, the two cables thus pulling a lower end of the link either forwardly or rearwardly, in order to pivot the arm either downwardly (as shown in FIG. 2) and thus lower the bumper, or else upwardly (as shown in FIG. 6) and thus raise the bumper. The motor may be conveniently pushbutton-controlled from the vehicle dashboard. The roller is limited to travel within a slot 33, formed by a "U"-shaped bar 34 on an underside of the arm. The forwardly pulling cable 30 extends around pulleys 35 and 36, in order to approach the arm from an opposite side of the cable 32.

As shown in FIG. 5, a removable crank handle on an end of the shaft 28 permits manual rotation of the shaft, if so preferred, instead of operating it by the motor.

When the bumper is in a raised position, a locking dog 37, pivoted on the bracket 21, hooks over a hook 38, thus hanging up the raised bumper and preventing it from falling down accidentally. As the bumper is raised, the dog automatically falls behind the hook, for the engagement therewith. For disengagement therewith, the vehicle operator depresses a pushbutton 39 on the dashboard,for activating a motor which winds up a cable 40, and pulls the dogs upwardly out of engagement with the hook, thus freeing the bumper lift in order to be lowered. Two guides 41 are attached to the beams 17 for the lift to slide therebetween, during movement.

While the bumper is free to pivot about the pins 20, this pivotal movement is arrested by the dogs 37 engaging a notch 42 on the arms 18, so as to hold the bumper upright, when in an operative, lowered position.

The rear lift 13 is constructed generally the same as the abovedescribed front lift 11. Accordingly, the foregoing description thereof in this Specification is the same for the rear lift, while like components in both lifts are identified on the Drawings with like reference numerals, these reference numerals on the rear lift being suffixed with an alphabetical character "a". The bumper 14 is shown differing in appearance from the bumper 12, and also including a hitch pin unit 43 for towing purposes.

In a modified construction of the present invention, a hydraulic system may be included, instead of the abovedescribed double cable mechanism 25.

It is now readily apparent, from the foregoing description, that the bumpers are each moved along an arcuate path during an elevation adjustment thereof, thereby also enabling an exact position adjustment thereof from the vehicle body.

In one example of use of the invention, incorporated on a Chevrolet Blazer or other four-wheel drive vehicle, the vehicle road travel may require the bumper being at approximately ten inches of elevation, while at the same time, being five inches angularly from the vehicle body.

While various changes may be made in the detail construction, it is understood that such changes will be within the spirit and scope of the present invention, as is defined by the appended claims.

What I claim as new, is:

1. A bumper lift assembly for a motor vehicle comprising:

a vehicle chassis frame having a pair of longitudinal beams;

a guide member attached to at least one end of each beam;

a stationary hanger attached to each beam at a point spaced from said guide members;

an arm pivotally connected to each hanger;

means to raise and lower said arms;

a bumper pivotally connected to said arms, and locking means connected to said bumper;

a hook-like member attached to each of said guide members, and a notch formed on each of said arms, such that when said arms are in a raised position said locking means engages said hook-like member to prevent pivotal movement of said bumper relative to said arms, and when said arms are in a lowered position said locking means engages said notch to prevent pivotal movement of said bumper relative to said arms.

* * * * *